United States Patent
Wand et al.

(10) Patent No.: US 8,045,836 B2
(45) Date of Patent: Oct. 25, 2011

(54) SYSTEM AND METHOD FOR RECORDING HIGH FRAME RATE VIDEO, REPLAYING SLOW-MOTION AND REPLAYING NORMAL SPEED WITH AUDIO-VIDEO SYNCHRONIZATION

(75) Inventors: Martin Austin Wand, Plano, TX (US); Michael Andrew Hannah, Fairview, TX (US); Paul Bastian Fernandez, Sachse, TX (US); Sreenivas Kothandaraman, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 503 days.

(21) Appl. No.: 12/343,644

(22) Filed: Dec. 24, 2008

(65) Prior Publication Data

US 2009/0180761 A1 Jul. 16, 2009

Related U.S. Application Data

(60) Provisional application No. 61/020,587, filed on Jan. 11, 2008.

(51) Int. Cl.
*H04N 5/932* (2006.01)
*H04N 5/935* (2006.01)
*H04N 9/80* (2006.01)

(52) U.S. Cl. ......... 386/219; 386/201; 386/220; 386/248
(58) Field of Classification Search .......... 386/200–232, 386/239, 248
See application file for complete search history.

(56) References Cited

U.S. PATENT DOCUMENTS

| | | | |
|---|---|---|---|
| 6,289,129 B1* | 9/2001 | Chen et al. | 382/232 |
| 6,418,268 B1* | 7/2002 | Boon | 386/353 |
| 2002/0015400 A1* | 2/2002 | Morinaga et al. | 370/345 |
| 2002/0106198 A1* | 8/2002 | Suzuki | 386/111 |
| 2003/0193940 A1* | 10/2003 | Kugumiya | 370/389 |
| 2006/0062300 A1* | 3/2006 | Park et al. | 375/240.12 |
| 2006/0203920 A1* | 9/2006 | Yongfang et al. | 375/240.28 |
| 2008/0056666 A1* | 3/2008 | Mio | 386/65 |
| 2009/0060059 A1* | 3/2009 | Koyama et al. | 375/240.28 |
| 2009/0201985 A1* | 8/2009 | Ramanzin | 375/240.01 |

* cited by examiner

*Primary Examiner* — Thai Tran
*Assistant Examiner* — Hung Dang
(74) *Attorney, Agent, or Firm* — Ronald O. Neerings; Wade James Brady, III; Frederick J. Telecky, Jr.

(57) ABSTRACT

A method to record high frame rate video, compatible with existing industry standards, that permits selecting either slow-motion playback or true speed playback with synchronized audio.

20 Claims, 2 Drawing Sheets

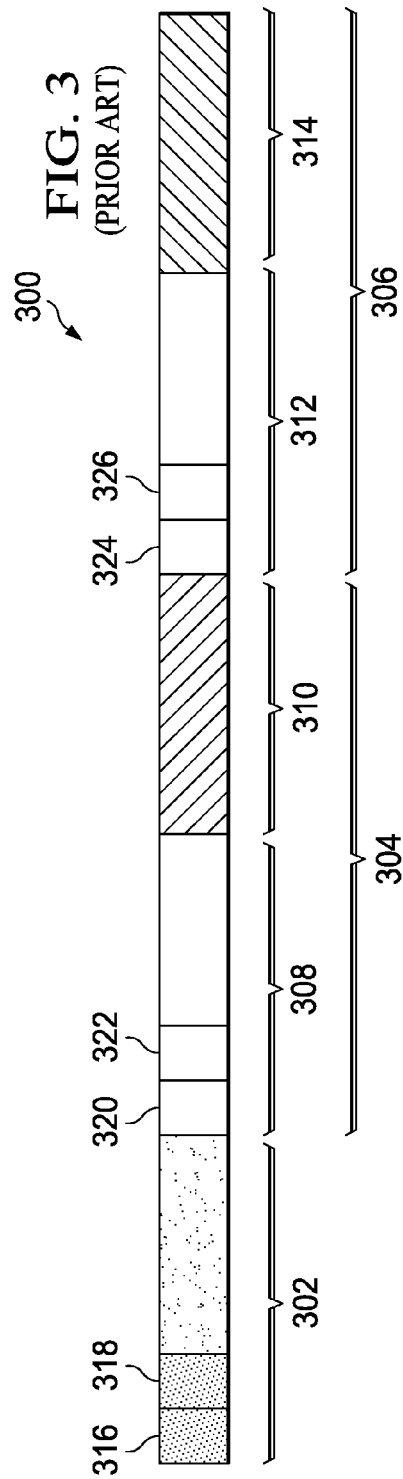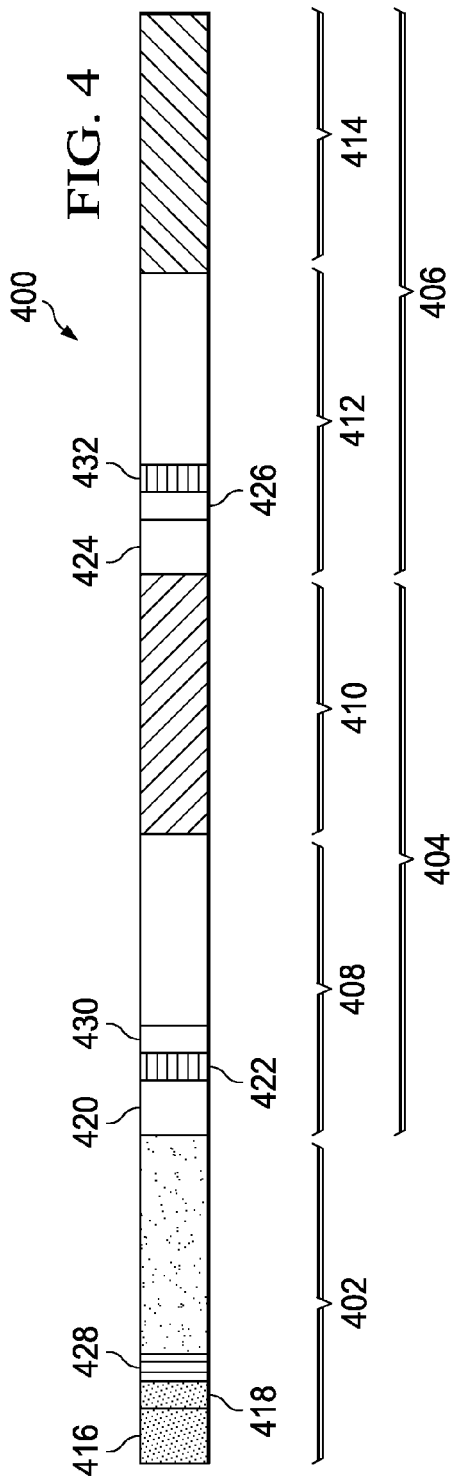

SYSTEM AND METHOD FOR RECORDING HIGH FRAME RATE VIDEO, REPLAYING SLOW-MOTION AND REPLAYING NORMAL SPEED WITH AUDIO-VIDEO SYNCHRONIZATION

The present application claims benefit under 35 U.S.C. §119 (e) to U.S. provisional patent application 61/020,587, filed Jan. 11, 2008, the entire disclosure of which is incorporated herein by reference.

BACKGROUND

FIG. 1 illustrates a conventional video system 100 including a recorder 102 and a player 104. Recorder 102 is able to record video and audio data and to transmit data 106 that is based on the recorded video and audio data to player 104. In some cases, transmission of data 106 may be via hard wire transmission, for example when recorder 102 and player 104 are in the same device such a video camera with a playback feature. In other cases, transmission of data 106 may be via wireless transmission, for example over cell phones. In other cases, transmission of data 106 may be via delivery of a recording medium, such as a disk or flash memory. However the delivery, player 104 is then able to playback video and audio data corresponding to the recorded video and audio data based on data 106.

As illustrated in the figure, recorder 102 includes a controller 108, a detector 110 and an encoder 112, whereas player 104 includes a controller 114, a decoder 116 and a display 118.

In operation of recorder 102, controller 108 instructs detector 110, via instruction line 120, to record images and audio data. In response, detector 110 records a first image 122 at time $t_1$ and serially outputs data corresponding thereto and then records a second image 124 at a time $t_2$ and serially outputs data corresponding thereto. A conventional detector of this type may include for example a charge coupled device. Detector 102 can further detect sound, for example via a microphone, and serially outputs audio data corresponding thereto. A bitstream of data 126 corresponding to first image 122 detected at time $t_1$, to second image 124 at a time $t_2$, and the audio data is then received by encoder 112. Controller 108 instructs encoder 112, via instruction line 128, to encode bitstream of data 126 to create a compressed bitstream 106 as discussed in more detail below.

Typically, the amount of data that any particular system may transmit and deliver is limited by physical parameters of the components of the system. Further, image data is very large compared to audio data. Therefore, to transmit or receive video data in its entirety may strain, or go beyond, the limits of a particular system. To avoid this situation, conventional techniques have been developed to compress video, and even audio, data.

One specific conventional video/audio compression technique follows the standard set and maintained by the Moving Picture Experts Group (MPEG). This compression technique supported by the MPEG standard is able to transform video data corresponding to a plurality of consecutively recorded individual images, each image of which comprises a large amount of image data, into a Group of Pictures (GOP). The compression technique supported by the MPEG standard is further operable to interleave audio data within video data.

FIG. 2 illustrates an exemplary bitstream 200 encoded with a compression technique supported by the MPEG standard. Bitstream 200 includes a plurality of GOPs 202 in addition to audio packets 204.

Each GOP 202, according to the MPEG standard, has a specific structure, which will be described with reference to FIG. 3.

FIG. 3 illustrates an exemplary GOP 300, which includes a Video Object Layer (VOL) header portion 302 and a plurality of Video Object Plane (VOPs) portions or Frames. For simplicity of discussion, in this example, GOP 300 includes a first VOP portion (or Frame) 304 and a second VOP portion (or Frame) 306.

VOL header portion 302 is a sequence level header associated with all VOP portions within GOP 300, which in this case are first VOP portion 304 and second VOP portion 306. VOL header portion 302 includes a Time-Increment-Resolution Code (TIRC) portion 316 and a user data portion 318. TIRC portion 316 comprises a 16-bit unsigned integer that represents the resolution of video time stamps for playback. A video time stamp is the time that is associated with a video frame in the encoded video bit stream that indicates the relative time of occurrence of that video frame with respect to the start of the recording. Specifically, TIRC portion 316 includes data corresponding to the time resolution of the video data or the number of units or "ticks" per second. User data portion 318 has additional information that can be used in the reassembly of the compressed digital video.

First VOP portion 304 includes a first VOP header portion 308 and a first VOP data portion 310. First VOP header portion 308 includes a first Time-Increment Code (TIC) portion 320 and a first user data portion 322. The TIC portion consists of a modulo time base and a time increment. The modulo time base is an integral second counter that represents the integral seconds elapsed since the last integral second in a previous frame modulo time base. The time increment is the difference between the current frame and the last integral second. It is represented as number of ticks, as defined in TIRC. In the case of first TIC portion 320, there is no previous frame, so both modulo time base and time increment will be zero.

Second VOP portion 306 includes a second VOP header portion 312 and a second VOP data portion 314. Second VOP header portion 312 includes a second TIC portion 324 and a second user data portion 326. The second TIC portion consists of a modulo time base, which indicates the integral seconds elapsed since the beginning of the sequence, and a time increment, which indicates the time difference between the second VOP and the last integral second.

As an example, if controller 108 instructs encoder 112 to encode the video data 126 at a frame rate of 30 frames per second (fps), and if controller 108 instructs encoder 112 to set first TIRC portion 320 to 300, the TIC portions will be calculated as follows, assuming no frame skips:

Time for Frame 1=0 sec;
Modulo time base frame 1=integral seconds elapsed since beginning of sequence=0 sec;
Vop_time_increment frame 1=0;
Time for Frame 2=333 msec;
Modulo time base Frame 2=integral seconds elapsed since beginning of sequence=0 sec; and
Time increment Frame 2=10.

Returning back to FIG. 1, encoder 112 encodes bitstream of data 126 with a compression technique supported by the MPEG standard to create a compressed bitstream 106.

In operation of player 104, decoder 116 receives compressed bitstream 106. Controller 114 instructs, via instruction line 130, decoder 116 to decompress the data in accordance with the MPEG standard to generate data stream 132 corresponding to first image 122 detected at time $t_1$, to second image 124 at a time $t_2$, and the audio data. Controller 114 further enables playback, via instruction line 134, of the video data at various playback speeds, as discussed in more detail below. Display 118 then plays back first image 136, second image 138 and the audio data.

Some conventional recorders, such as video cameras, camera phones and digital cameras, may record at various frame rates, selectable by the recorder operator. In fact some offer the capability to record high frame rate video, i.e., frames rates higher than 30 fps, with a bitstream format having an apparent record frame rate that is a normal frame rate video, e.g., 30 fps. The apparent frame rate must be no greater than 30 fps for the bitstream to be compliant. The video time stamps can be scaled in the recorded video by a slow-motion factor that makes the video "look like" it was recorded at a different rate. When played back, the result is a slow-motion playback, i.e., a video playback speed that is slower than the original live view, which has a slow-motion factor associated therewith. Slow-motion factor is the factor by which the video is played back at slower than the original live view in a conventional video player, i.e., a 30 second video recording that is recorded at twice the playback frame rate then played back at a constant frame rate over 60 seconds, has a slow-motion factor of 2×.

For example, if the video is recorded at 120 fps and played back at 30 fps, the video appears to have a 4× speed reduction during playback because it takes 4 seconds to playback every 1 second that was recorded (120 frames). This has an advantage over simply playing back 30 fps video at 7.5 fps. Specifically, by playing back 30 fps video at 7.5 fps, frames must be duplicated to achieve a 30 fps display rate, which results in a jerkiness in the video. However, playing back high frame video at 30 fps results in every frame in the 30 fps playback being unique, resulting in much smoother motion.

True-speed playback is the video playback speed that looks like the original live view, i.e., a recording of a clock second hand would show one elapsed second for each second of playback. The problem in existing implementations is that a true-speed playback cannot easily be achieved because the original recording frame rate is not known. Since the bit stream format "looks" like 30 fps (for example), one would need to "know" that the video was recorded at 120 fps then manually configure the video player to only display 1 out of every 4 frames at 30 fps. The video could have been recorded instead at 90 fps in which case the video player must display 1 out of every 3 frames at 30 fps.

What is needed is a system and method to playback the true recording speed of a recorded video with audio, that remains compatible with existing playback systems.

BRIEF SUMMARY

It is an object of the present invention to provide a system and method to playback the true recording speed of a high frame rate recorded video with audio, that is compatible with existing playback systems.

The present invention solves the problem stated above by providing a mechanism by which the original recording frame rate can be inserted into the video bit stream. This information can then be used by the video player to playback the video at whatever effective slow-motion factor the viewer desires.

In accordance with an aspect of the present invention, an encoder is operable to encode the user data portion of the VOL header of an MPEG compressed GOP to include therein a recorded-time-increment-resolution data portion that represents the number of ticks per second as recorded.

In accordance with another aspect of the present invention, an encoder is operable to encode the user data portion of each VOP header of an MPEG compressed GOP to include therein a recorded-time-increment data portion, which includes a recorded modulo time base and a recorded time increment. The recorded modulo time base represents the integral seconds between the current frame and the last integral second in a previous frame recorded modulo time base. The recorded time increment is the number of ticks, as defined in the recorded time increment resolution, between the current frame and the last integral second.

In accordance with another aspect of the present invention, a decoder is operable to decode a recorded-time-increment-resolution data portion to recognize the true recording speed.

In accordance with another aspect of the present invention, a decoder is operable to decode the recorded-time-increment data portion to play the video data at the true speed with sound, or above or below the true speed without sound.

An exemplary embodiment of the present invention includes recording device for use with a displaying device operable to display a video comprising a first image and a second image. The displaying device is further operable to display the first image at a first time based on a time stamp $t_{p1}$ for a time increment and to display the second image at a second time based on a time stamp $t_{p2}$ for the time increment. The recording device includes a video data generating portion and an encoding portion. The video data generating portion is operable to detect the first image at a recorded time $t_1$ for a recorded time increment, to detect the second image at a recorded time $t_2$ for the recorded time increment and to generate video data corresponding to the first image and the second image. The encoding portion is operable to encode the video data into a bitstream including a time-increment-resolution code portion, a time-increment code portion, a recorded-time-increment-resolution code portion and a recorded-time-increment code portion. The time-increment-resolution code portion is capable of storing data therein representing a resolution of the time increment. The time-increment code portion is capable of storing data therein corresponding to a modulo time base and the time increment. The recorded-time-increment-resolution code portion is capable of storing data therein representing a resolution of the recorded time increment. The recorded-time-increment code portion is capable of storing data therein corresponding to a recorded modulo time base and the recorded time increment.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 3 illustrates an exemplary GOP in accordance with the MPEG standard; and

FIG. 4 illustrates an exemplary GOP in accordance with the MPEG standard and in accordance with an exemplary embodiment of the invention.

DETAILED DESCRIPTION

Figure 1:
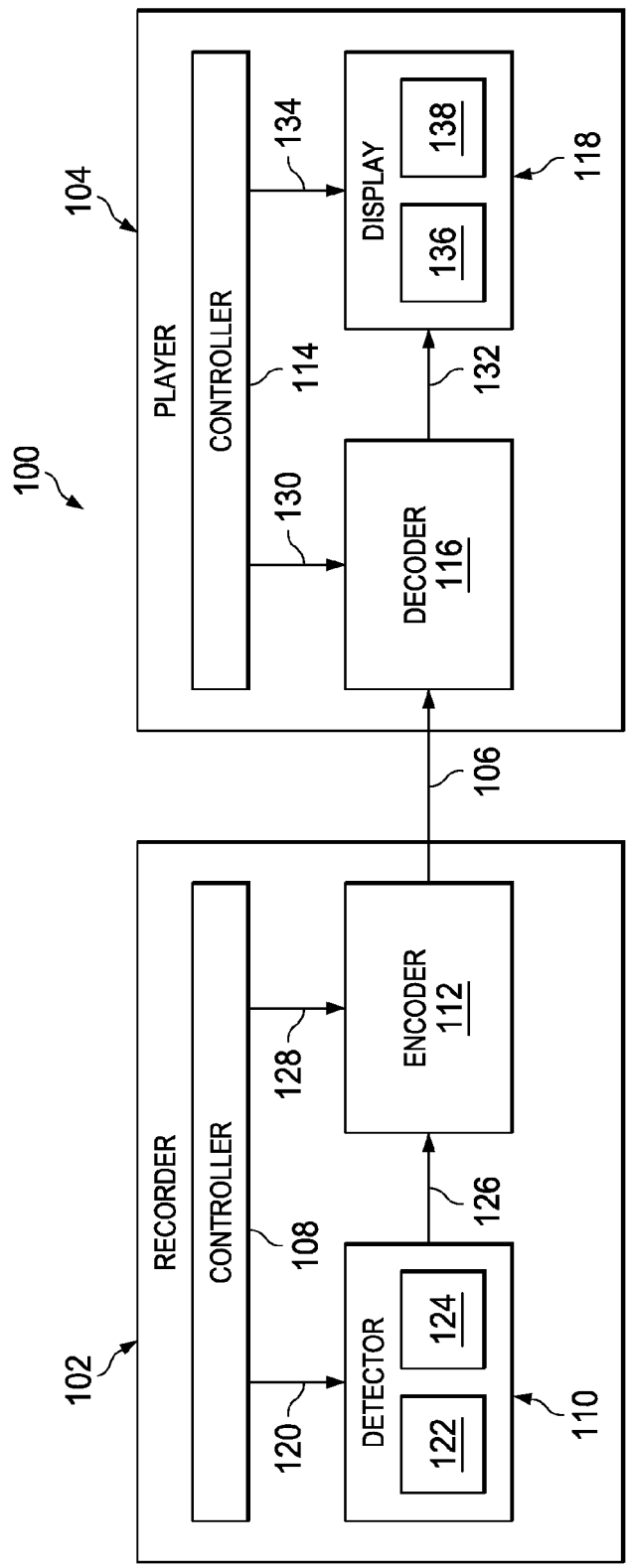
FIG. 1 illustrates a conventional video recorder/player.

An exemplary embodiment of the present invention will now be described with reference to FIG. 4.

FIG. 4 illustrates an exemplary GOP 400 in accordance with the MPEG standard, but modified to include two important data portions.

Similar to GOP 300 discussed above with reference to FIG. 3, GOP 400 includes a VOL header portion 402 and a plurality of VOPs (Frames) portions. For simplicity of discussion, in this example, GOP 400 includes a first VOP (Frame) portion 404 and a second VOP (Frame) portion 406.

Similar to VOL header portion 302 discussed above with reference to FIG. 3, VOL header portion 402 is a sequence level header associated with all VOP portions within GOP 400, which in this case are first VOP portion 404 and second VOP portion 406. VOL portion 402 includes a TIRC portion 416 and a user data portion 418.

Similar to first VOP portion 304 discussed above with reference to FIG. 3, first VOP portion 404 includes a first VOP header portion 408 and a first VOP data portion 410. First VOP header portion 408 includes a first TIC portion 420 and a first user data portion 422. In the case of first TIC portion 420, there is no previous frame, so both modulo time base and time increment will be zero.

Similar to second VOP portion 306 discussed above with reference to FIG. 3, second VOP portion 406 includes a second VOP header portion 412 and a second VOP data portion 414. Second VOP header portion 412 includes a second TIC portion 424 and a second user data portion 426. The second TIC portion 424 consists of a modulo time base, which indicates the number of integral seconds between the second frame 406 and the first frame 404, and a time increment, which represents the time difference between the second frame 406 and the last integral second.

Distinct from user data portion 318 discussed above with reference to FIG. 3, user data portion 418 includes a Recorded-Time-Increment-Resolution Code (RTIRC) portion 428. RTIRC portion 428 comprises a 16-bit unsigned integer that represents the resolution of video time stamps as recorded. A video time stamp is the time that is associated with a video frame in the encoded video bit stream that indicates the relative time of occurrence of that video frame with respect to the start of the recording. Specifically, RTIRC portion 428 includes data corresponding to the time resolution of the video data as recorded or the number of units or "ticks" per second. RTIRC portion 428 corresponds to the resolution of the video data as recorded, whereas TIRC portion 416 is a conventional data portion that corresponds to the resolution of the video data for purposes of playback by a compliant decoder.

Distinct from first user data portion 322 discussed above with reference to FIG. 3, first user data portion 422 includes a first Recorded-Time-Increment Code (RTIC) portion 430, and second user data portion 426 includes a second RTIC portion 432. Data within first RTIC portion 430 and second RTIC portion 432 indicates the real video record frame rate, which may be provided in terms of a frame rate (recorded modulo time base and recorded time increment), a slow-motion factor or both a multiplier and divider that represents the slow-motion factor. For example, a frame rate of 120 fps or a 4× slow-motion factor would be used if generating a 30 fps recording from a 120 fps input. RTIC portions 430 and 432 correspond to the recorded frame rate of the video data, whereas TIC portions 420 and 424 are conventional data portions that correspond to the frame rate of the video data for purposes of playback by a compliant decoder.

One will note that first VOP portion 404 includes the modulo time base and time increment code, i.e., the apparent record frame rate, in first TIC portion 420. Similarly, second VOP portion 406 includes the modulo time base and time increment code, i.e., the apparent record frame rate, in second TIC portion 424. As such, a conventional video player would recognize the apparent frame rate, e.g., 30 fps, and would therefore be interoperable with a recorder in accordance with the present invention. For example, suppose first RTIC portion 430 and second RTIC portion 432 indicates a real video record frame rate in terms of a 4× slow-motion factor. A conventional video player would not recognize first RTIC portion 430 or second RTIC portion 432. Therefore, the conventional video player would not recognize the 4× slow-motion factor indicated within first RTIC portion 430 or second RTIC portion 432. The conventional video player would, however as discussed above, recognize the apparent record frame rate. In such a case, with a 4× slow-motion factor, a frame recorded 2 seconds after the start of recording would have a time stamp of 8 seconds, which is the time that frame would appear after the start of playback when played back by an existing video player.

Figure 2:
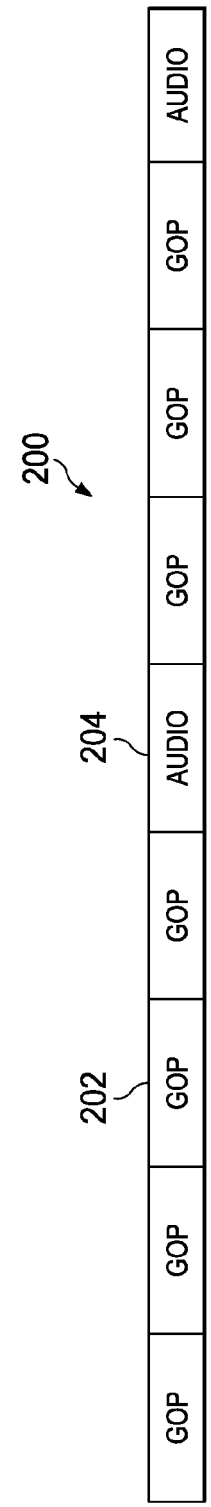
FIG. 2 illustrates an exemplary bitstream encoded with a compression technique supported by the MPEG standard.

Returning back to FIG. 2, as for interleaving audio packets 204, in accordance with the present invention, audio data can be recorded along with the video data. However, audio packets 204 may not playback, i.e., be decoded, correctly in existing video players. This is due to the fact that each audio packet 204 will have a true-speed audio time stamps, which are associated with an audio frame in the encoded audio bit stream that indicates the relative time of occurrence of that audio frame with respect to the start of the recording. In accordance with the present invention, if the video data is recorded in a frame rate that is different than the apparent record frame rate, i.e., the RTIC portion within a frame includes a real recorded frame rate, then the video data will have scaled time stamps. As such, the video data will run slower than the audio data. For example, 30 seconds of recording with the example 4× slow-motion factor would result in 30 seconds of audio but the apparent length of the video would be 120 seconds.

A video player in accordance with the present invention is operable to recognize TIRC portion 416 and TIC portions 420 and 424 as defined by the MPEG standard. A video player in accordance with the present invention is operable to additionally recognize RTIRC portion 428 and RTIC portions 430 and 432. As such, a video player in accordance with the present invention will decode the video data, frame-for-frame, and interpret RTIRC portion 428 and RTIC portions 430 and 432 to determine any encoded recorded frame rate, e.g., slow-motion factors.

Once the real recorded frame rate is known, a video player in accordance with the present invention can provide an accurate and known true-speed playback. In particular, such a video player may accept a playback speed factor p, for example via any known user interface, wherein a playback speed factor p=1× is real-time and p>1× is slow-motion. On the contrary, a conventional video player may test a range of playback factors when decoding bitstream 400 and may, at some point, provide a true-speed playback. However, in such a case, the conventional player, and user of the player, will not know that the playback speed is the true-speed. Accordingly, one of the benefits of the present invention is the ability to provide an accurate and known true-speed playback.

A video player in accordance with the present invention can further compute the playback frame rate. TIC portion portions 420 and 424 include the video time stamps V=fps. RTIC portions 430 and 432 include the recorded frame rate, which may be in the form of a slow-motion factor=s. A user may provide, via a user interface as discussed above, the playback speed factor=p. The video player may then compute the playback frame rate=f=(V*s/p fps).

Furthermore, a video player in accordance with the present invention can skip frames between a video decoder output and a display to match a desired playback speed with a user provided display update frame rate d. For example, by using die computed playback frame rate=f discussed above, in conjunction with the user provided display update frame rate d, the video player may easily compute to skip (f-d) out of every (f) frames, wherein frames must be skipped uniformly during playback.

Still further, as noted above, a video player in accordance with the present invention can enable and synchronize the audio data with the video data when displaying the decoded video data at true-speed (playback speed factor=1). This would not be possible without precise knowledge of the frame rate at which the video was recorded. Note that audio output can only be synchronized with the video output during true-speed playback.

Playback equipment capable of decoding the recorded frame rate, can process the bitstream and display, as the operator chooses, slow-motion, or real-time video with synchronized sound.

In accordance with the present invention, a user is able to playback at slow-motion or true-speed via a user interface. In conventional systems, the user cannot select true-speed playback. More specifically, in conventional systems, the user can select virtually any playback speed, but will not know the true-speed and further cannot dial-in a specific playback speed factor.

Since an aspect of the present invention enables true-speed playback, the present invention additionally enables synchronizing video playback with audio playback. In conventional systems, there is no audio because video is recorded such that it cannot be played back at true-speed and therefore cannot be synchronized with audio. In accordance with the present invention, audio could be recorded along with the video, then audio could be ignored during playback except when playback is at true-speed.

Aspects of the invention may be extended to other video compression standards. An example embodiment in accordance with the present invention in the H264 video compression standard will be described below.

The H264 compression technique is able to transform a video sequence corresponding to a plurality of consecutive recorded individual images, each image of which comprises a large amount of data, into a number of Network Abstraction Layer (NAL) units. These NAL units will contain sequence headers, picture headers or picture data. The NAL units include the time stamp for each frame, which corresponds to the apparent frame rate, e.g 30 fps.

Each frame of the H264 bitstream has a Supplemental Enhancement Information (SEI) NAL unit that includes a user_data_unregistered payload. The user_data_unregistered payload includes an RTIRC, which is a 16-bit integer that represents the resolution of the Video stamps as recorded, and an RTIC. Data within the RTIC indicates the real video recorded frame rate, which may be provided in terms of frame rate (recorded modulo time base and recorded time increment), a slow motion factor or both a multiplier and divider that represents the slow motion factor. For example, a frame rate of 120 fps or a 4× slow-motion factor.

The NAL units include frame time stamps corresponding to the apparent frame rate. As such, a conventional video player would recognize the apparent frame rate, e.g 30 fps, and would therefore be interoperable with a recorder in accordance with the present invention. For example, suppose RTIC portions in the user_data_unregistered payload of the SEI NAL unit of each frame indicates a recorded frame rate in terms of a 4× slow-motion factor. A conventional video player would not recognize the 4× slow-motion factor indicated by the RTIC portions, but would recognize the apparent frame rate of 30 fps.

A video player in accordance with the present invention is operable to recognize the time stamps present in the NAL units, which indicate the apparent frame rate. A video player in accordance with the present invention is operable to additionally recognize the RTIRC and RTIC portions in the user_data_unregistered payload of the SEI NAL units. As such, a video player in accordance with the present invention will determine the recorded frame rate, e.g slow-motion factor.

Many of the example embodiments discussed-above include an example of a 30 fps recording from a 120 fps input. In accordance with aspects of the present invention, the apparent from rate is not limited to 30 fps and the actual frame rate is not limited to 120 fps.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A recording device for use with a displaying device operable to display a video comprising a first image and a second image, the displaying device being further operable to display the first image at a first time based on a time stamp $t_{p1}$ for a time increment and to display the second image at a second time based on a time stamp $t_{p2}$ for the time increment, said recording device comprising:

a video data generating portion operable to detect the first image at a recorded time $t_1$ for a recorded time increment, to detect the second image at a recorded time $t_2$ for the recorded time increment and to generate video data corresponding to the first image and the second image; and an encoding portion operable to encode the video data into a bitstream including a time-increment-resolution code portion, a time-increment code portion, a recorded-time-increment-resolution code portion and a recorded-time-increment code portion, the time-increment-resolution code portion being capable of storing data therein representing a resolution of the time increment, the time-increment code portion being capable of storing data therein corresponding to a modulo time base and the time increment, the recorded-time-increment-resolution code portion being capable of storing data therein representing a resolution of the recorded time increment and the recorded-time-increment code portion being capable of storing data therein corresponding to a recorded modulo time base and the recorded time increment.

2. The recording device of claim 1,
wherein said encoding portion is operable to encode the video data into the bitstream to comprise a group of pictures comprising a video object layer header portion, a first video object plane portion and a second video object plane portion,
wherein the video object layer header portion comprises the time-increment-resolution code portion and a video object layer user data portion,
wherein the first video object plane portion comprises a first video object plane header portion and a first video object plane data portion,
wherein the second video object plane portion comprises a second video object plane header portion and a second video object plane data portion,
wherein the second video object plane header portion comprises the time-increment code portion and a second video object plane user data portion,
wherein the video object layer user data portion comprises the recorded-time-increment-resolution code portion, and
wherein the second video object plane user data portion comprises the recorded-time-increment code portion.

3. The recording device of claim 2, wherein said encoding portion is operable to encode the video data to include data corresponding to 300 units per second in the time-increment-resolution code portion as the resolution of the time increment.

4. The recording device of claim 3, wherein said encoding portion is operable to encode the video data to include data corresponding to 1200 units per second in the recorded-time-increment-resolution code portion as the resolution of the recorded time increment.

5. The recording device of claim 2, wherein said encoding portion is operable to encode the video data to include data corresponding to 1200 units per second in the recorded-time-increment-resolution code portion as the resolution of the recorded time increment.

6. The recording device of claim 1, wherein said encoding portion is operable to encode the video data into the bitstream to comprise a plurality of network abstraction layer units that include a supplemental enhancement information unit.

7. A display device for use with a bitstream of data corresponding to a video comprising a first image and a second image, the first image to be displayed at a first time based on a time stamp $t_{p1}$ for a time increment and the second image to be displayed at a second time based on a time stamp $t_{p2}$ for the time increment, the first image having been recorded at a recorded time $t_1$ for a recorded time increment, the second image having been recorded at a recorded time $t_2$ for the recorded time increment, the bitstream of data comprising a time-increment-resolution code portion, a time-increment code portion, a recorded-time-increment-resolution code portion and a recorded-time-increment code portion, the time-increment-resolution code portion having data stored therein representing a resolution of the time increment, the time-increment code portion having data stored therein corresponding to a modulo time base and the time increment, the recorded-time-increment-resolution code portion having data stored therein representing a resolution of the recorded time increment and the recorded-time-increment code portion having data stored therein corresponding to a recorded modulo time base and the recorded time increment, said display device comprising:

a decoding portion operable to receive the bitstream of data, to generate first image data corresponding to the first image, to generate second image data corresponding to the second image, to determine the resolution of the recorded time increment from the recorded time-increment-resolution code portion and to determine the recorded modulo time base and recorded time increment from the second recorded time-increment code portion;
a controller operable to provide a control signal, and
a display portion operable to display, based on the control signal, the first image at the recorded time $t_{p1}$ for the recorded time increment and to display the second image at the recorded time $t_{p2}$ for the recorded time increment.

8. The display device of claim 7,
wherein said decoding unit is operable to decode the bitstream of data into a group of pictures comprising a video object layer header portion, a first video object plane portion and a second video object plane portion,
wherein the video object layer header portion comprises the time-increment-resolution code portion and a video object layer user data portion,
wherein the first video object plane portion comprises a first video object plane header portion and a first video object plane data portion,
wherein the second video object plane portion comprises a second video object plane header portion and a second video object plane data portion,
wherein the second video object plane header portion comprises the time-increment code portion and a second video object plane user data portion,
wherein the video object layer user data portion comprises the recorded-time-increment-resolution code portion, and
wherein the second video object plane user data portion comprises the recorded-time-increment code portion.

9. The display device of claim 8, wherein said decoding portion is operable to decode the bitstream of data to include data corresponding to 300 units per second in the time-increment-resolution code portion as the resolution of the time increment.

10. The display device of claim 9, wherein said decoding portion is operable to decode the bitstream of data to include data corresponding to 1200 units per second in the recorded-time-increment-resolution code portion as the resolution of the recorded time increment.

11. The display device of claim 8, wherein said decoding portion is operable to decode the bitstream of data to include data corresponding to 1200 units per second in the recorded-time-increment-resolution code portion as the resolution of the recorded time increment.

12. The display device of claim 7, wherein said decoding unit is operable to decode the bitstream of data into a plurality of network abstraction layer units that include a supplemental enhancement information unit.

13. A method of recording a video for display by a displaying device, the video comprising a first image and a second image, the displaying device being operable to display the first image at a first time based on a time stamp $t_{p1}$ for a time increment and to display the second image at a second time based on a time stamp $t_{p2}$ for the time increment, said method comprising:

detecting the first image at a recorded time $t_1$ for a recorded time increment;
detecting the second image at a recorded time $t_2$ for the recorded time increment;

generating video data corresponding to the first image and the second image; and encoding the video data into a bitstream including a time-increment-resolution code portion, a time-increment code portion, a recorded-time-increment-resolution code portion and a recorded-time-increment code portion, the time-increment-resolution code portion being capable of storing data therein representing a resolution of the time increment, the time-increment code portion being capable of storing data therein corresponding to a modulo time base and the time increment, the recorded-time-increment-resolution code portion being capable of storing data therein representing a resolution of the recorded time increment and the recorded-time-increment code portion being capable of storing data therein corresponding to a recorded modulo time base and the recorded time increment.

14. The method of claim 13, wherein said encoding encoding comprises encoding the video data into the bitstream to comprise a group of pictures comprising a video object layer header portion, a first video object plane portion and a second video object plane portion, wherein the video object layer header portion comprises the time-increment-resolution code portion and a video object layer user data portion, wherein the first video object plane portion comprises a first video object plane header portion and a first video object plane data portion, wherein the second video object plane portion comprises a second video object plane header portion and a second video object plane data portion, wherein the second video object plane header portion comprises the time-increment code portion and a second video object plane user data portion, wherein the video object layer user data portion comprises the recorded-time-increment-resolution code portion, and wherein the second video object plane user data portion comprises the recorded-time-increment code portion.

15. The method of claim 14, wherein said encoding comprises encoding the video data to include data corresponding to 300 units per second in the time-increment-resolution code portion as the resolution of the time increment.

16. The method of claim 15, wherein said encoding comprises encoding the video data to include data corresponding to 1200 units per second in the recorded-time-increment-resolution code portion as the resolution of the recorded time increment.

17. The method of claim 14, wherein said encoding comprises encoding the video data to include data corresponding to 1200 units per second in the recorded-time-increment-resolution code portion as the resolution of the recorded time increment.

18. The method of claim 13, wherein said encoding comprises encoding the video data into the bitstream to comprise a plurality of network abstraction layer units that include a supplemental enhancement information unit.

19. The method of claim 18, wherein said encoding comprises encoding the video data to include data corresponding to 30 fps in the time stamp $t_{p1}$ and the time stamp $t_{p2}$.

20. The method of claim 19, wherein said encoding comprises encoding the video data to include data corresponding to 1200 units per second in the recorded-time-increment-resolution code portion as the resolution of the recorded time increment.

* * * * *